United States Patent
Ito et al.

(10) Patent No.: US 7,396,791 B2
(45) Date of Patent: *Jul. 8, 2008

(54) ELECTRONIC DEVICE, DIELECTRIC CERAMIC COMPOSITION AND THE PRODUCTION METHOD

(75) Inventors: Kazushige Ito, Chou-ku (JP); Akira Sato, Chuo-ku (JP)

(73) Assignee: TDK Corporation, Tokyo (JP)

(*) Notice: Subject to any disclaimer, the term of this patent is extended or adjusted under 35 U.S.C. 154(b) by 171 days.

This patent is subject to a terminal disclaimer.

(21) Appl. No.: 11/332,253

(22) Filed: Jan. 17, 2006

(65) Prior Publication Data

US 2006/0160692 A1 Jul. 20, 2006

(30) Foreign Application Priority Data

Jan. 20, 2005 (JP) ............................. 2005-012827

(51) Int. Cl.
*C04B 35/468* (2006.01)
(52) U.S. Cl. ........................ 501/137; 501/138; 501/139; 361/321.4
(58) Field of Classification Search ................ 501/137, 501/138, 139; 361/321.4
See application file for complete search history.

(56) References Cited

U.S. PATENT DOCUMENTS

| | | | | |
|---|---|---|---|---|
| 4,999,738 A * | 3/1991 | Kishi et al. | ............... | 361/321.4 |
| 5,075,819 A * | 12/1991 | Saito et al. | ............... | 361/321.4 |
| 5,089,933 A * | 2/1992 | Saito et al. | ............... | 361/321.4 |
| 5,319,517 A * | 6/1994 | Nomura et al. | ........... | 361/321.4 |
| 6,226,172 B1 * | 5/2001 | Sato et al. | .................... | 361/311 |
| 6,346,497 B1 * | 2/2002 | Nakamura et al. | .......... | 501/138 |
| 6,403,513 B1 * | 6/2002 | Sato et al. | .................... | 501/137 |
| 6,548,437 B2 * | 4/2003 | Sato et al. | .................... | 501/139 |
| 6,829,137 B2 * | 12/2004 | Konaka et al. | ........... | 361/321.4 |
| 6,960,547 B2 * | 11/2005 | Matoba et al. | .............. | 501/139 |
| 6,999,302 B2 * | 2/2006 | Ito et al. | ................... | 361/321.2 |

FOREIGN PATENT DOCUMENTS

| | | | |
|---|---|---|---|
| JP | 56-6417 | * | 1/1981 |
| JP | A 2004-214539 | | 7/2004 |

* cited by examiner

*Primary Examiner*—Karl E Group
(74) *Attorney, Agent, or Firm*—Oliff & Berridge, PLC (57) ABSTRACT

A dielectric ceramic composition comprising a main component including Ba, Ca and Ti and having a perovskite crystal structure expressed by a general formula $ABO_3$ and a fourth subcomponent including a compound of Zr; wherein a content of the fourth subcomponent with respect to 100 moles of the main component is larger than 0 mole and smaller than 5 moles in terms of Zr and, preferably, a segregation phase including the compound of Zr is provided.

14 Claims, 2 Drawing Sheets

ELECTRONIC DEVICE, DIELECTRIC CERAMIC COMPOSITION AND THE PRODUCTION METHOD

BACKGROUND OF THE INVENTION

1. Field of the Invention

The present invention relates to a dielectric ceramic composition having reduction resistance, a production method thereof, and an electronic device, such as a multilayer ceramic capacitor, using the dielectric ceramic composition.

2. Description of the Related Art

A multilayer ceramic capacitor as an electronic device is widely used as a highly reliable compact electronic device having a large capacity and by a large number in one electronic apparatus. In recent years, as the apparatuses become more compact and higher in performance, demands for a multilayer ceramic capacitor to be more compact with a larger capacity, low at cost and higher in reliability have become still stronger.

A multilayer ceramic capacitor is normally produced by using internal electrode layer paste and dielectric layer paste, stacking them by using a sheet method or a printing method, etc. and co-firing internal electrode layers and dielectric layers in an obtained stacked body.

As a conductive material of the internal electrode layers, Pd and a Pd alloy are generally used, but due to the high price thereof, relatively inexpensive base metals, such as Ni and a Ni alloy, have come to be used. When using a base metal as a conductive material of internal electrode layers, the internal electrode layers are oxidized when fired in the air. Therefore, co-firing of the dielectric layers and internal electrode layers has to be performed in a reducing atmosphere. However, when fired in a reducing atmosphere, the dielectric layers are reduced and the specific resistance declines. Thus, reduction-resistant dielectric materials have been developed.

However, a multilayer ceramic capacitor using a reduction-resistant dielectric material has disadvantages that a decline of IR (insulation resistance) due to an application of an electric field is remarkable, the IR lifetime is short and the reliability is low.

Capacitors are also required to have preferable temperature characteristics of the capacity and, particularly, required to have a flat temperature characteristic of the capacity under a severe condition depending on the use object. In recent years, multilayer ceramic capacitors have come to be used in a variety of electronic apparatuses, such as an engine electronic control unit (ECU) to be installed in an engine room of vehicles, a crank angle sensor and an Anti Lock Brake System (ABS) module. Since these electronic devices are for stable engine controlling, drive controlling and brake controlling, preferable temperature stability of the circuit is required.

Environments of using the electronic apparatuses are expected to become about −20° C. or lower in winter in cold climates and about +130° C. or higher after the engine starts in summer. Recently, there is a tendency of reducing a wire harness for connecting the electronic apparatus and an apparatus to be controlled thereby and the electronic apparatus may be provided outside of a vehicle, therefore, environments for the electronic apparatuses have been getting more severe. Accordingly, a capacitor used by the electronic apparatuses is required to have flat temperature characteristics in a wide temperature range. Specifically, it is not sufficient when the capacity-temperature characteristics only satisfy the X7R characteristic of EIA standard (−55 to 125° C., ΔC/C=within ±15%), and a dielectric ceramic composition satisfying the X8R characteristics of EIA standard (−55 to 150° C., ΔC/C=within ±15%) is required.

For example, in the Japanese Unexamined Patent Publication No. 2004-214539, by giving a predetermined composition and making unevenness of average Ca concentration in crystal grain between the crystal grains to be in a certain range, a dielectric ceramic composition satisfying the X8R characteristics is obtained. This publication discloses as example samples, wherein compounding ratios of the main component materials are changed, and samples, wherein compositions of the subcomponents are changed, and also discloses, for example, a dielectric ceramic composition including Zr elements, such as $CaZrO_3$. However, dielectric ceramic composition disclosed in this publication has a disadvantage that the breakdown voltage and TC bias characteristics (capacity-temperature characteristics when applied with a direct-current voltage) are poor, while the capacity-temperature characteristics are improved.

SUMMARY OF THE INVENTION

An object of the present invention is to provide a dielectric ceramic composition having high specific permittivity, capable of maintaining an insulation resistance lifetime and DC bias characteristics (direct current voltage application dependency of the permittivity), having capacity-temperature characteristics satisfying the X8R characteristics (−55 to 150° C., ΔC/C=within ±15%) of the EIA standard, able to be fired in a reducing atmosphere, and having an improved breakdown voltage and TC bias characteristics (capacity-temperature characteristics when applied with a direct current voltage) and a production method thereof. Another object of the present invention is to provide an electronic device, such as a multilayer ceramic capacitor, particularly able to be formed compact and to have thinner layers and capable of realizing a compact body with a larger capacity by using the dielectric ceramic composition as above.

To attain the above objects, according to the present invention, there is provided a dielectric ceramic composition, comprising a main component including Ba, Ca and Ti and having a perovskite crystal structure expressed by a general formula $ABO_3$, and a fourth subcomponent including a compound of Zr;

wherein a content of the fourth subcomponent is larger than 0 mole and smaller than 5 moles with respect to 100 moles of the main component.

In the present invention, as a result of including a compound of Zr in the above predetermined amount, the breakdown voltage and the TC bias characteristics can be improved without deteriorating the capacity-temperature characteristics when used as a dielectric layer of an electronic device, such as a ceramic capacitor. The compound of Zr is not particularly limited and, for example, oxides of Zr and composite oxides including Zr elements may be mentioned.

In the present invention, preferably, the dielectric ceramic composition includes a segregation phase, and the segregation phase includes a compound of Zr.

In the present invention, the segregation phase (secondary phase) is a part where a Zr compound and other additive subcomponents are segregated in the dielectric ceramic composition and these additive subcomponents exist at higher concentration comparing with those in a main phase composed mainly of a main component. By forming a segregation layer in the dielectric ceramic composition and including the compound of Zr in the segregation phase, an effect of adding the compound of Zr can be enhanced.

In the present invention, a C.V. value of a distribution of Zr elements calculated by a formula (1) below from standard deviation σ of detection strength and an average detection strength x of the Zr compound distribution in the dielectric layer is preferably 100 or lower, more preferably 75 or lower, and furthermore preferably 65 or lower.

$$\text{C.V. value} = (\text{standard deviation } \sigma \text{ of detection strength/an average detection strength } x) \times 100 \quad (1)$$

The above C.V. (coefficient of variation) value is a value obtained by dividing the standard deviation σ of the detection strength of a distribution of an element by the average detection strength x of the element distribution in the dielectric ceramic composition and indicates the dispersion degree of the element. The lower the value is, the higher the dispersion degree is. The C.V. value of the Zr elements (compound of Zr) distribution is preferably small, that is, the dispersion degree of Zr elements (compound of Zr) is preferably high in the present invention.

In the present invention, preferably, the compound of Zr composing the fourth subcomponent is included as $CaZrO_3$ which is composite oxide with Ca. Alternately, in the present invention, the compound of Zr composing the fourth subcomponent preferably is included as an oxide of Zr with an oxide of Ca (that is, as $CaO + ZrO_2$).

In the present invention, preferably, the main component is expressed by a composition formula of $(Ba_{1-x} Ca_x)_m (Zr_{1-y} Ti_y) O_3$, and "m", "x" and "y" in the composition formula satisfy $0.995 \leq m \leq 1.020$, $0 < x \leq 0.15$, and $0 \leq y \leq 1.00$.

Preferably, the dielectric ceramic composition comprises a first subcomponent including at least one kind selected from MgO, CaO, BaO and SrO, a second subcomponent including an oxide of Mn or Cr, and a third subcomponent including an oxide of R (note that R is at least one kind selected from Sc, Y, La, Ce, Pr, Nd, Pm, Sm, Eu, Gd, Tb, Dy, Ho, Er, Tm, Yb and Lu);

wherein ratios of the subcomponents with respect to 100 moles of the main component are first subcomponent: 0.1 to 5 moles, second subcomponent: 0.1 to 2.5 moles (note that the number of moles of the second subcomponent is a ratio of Mn or Cr elements alone), third subcomponent: 0.1 to 12 moles (note that the number of moles of the third subcomponent is a ratio of R alone).

Preferably, the oxide of R included in the third subcomponent is an oxide of at least one kind selected from Y, Gd, Tb, Dy, Ho, Er and Yb.

Preferably, the dielectric ceramic composition furthermore comprises a fifth subcomponent including at least one kind selected from $V_2O_5$, $MoO_3$ and $WO_3$; and a ratio of the fifth subcomponent with respect to 100 moles of the main component is 0.01 to 0.2 mole.

Preferably, the dielectric ceramic composition furthermore comprises a sixth subcomponent including oxide silicon as a main component thereof; and a ratio of the sixth subcomponent with respect to 100 moles of the main component is 1 to 10 moles.

In the present invention, preferably, an average crystal grain diameter of dielectric particles composing the dielectric ceramic composition is 1 μm or smaller, and more preferably 0.5 μm or smaller.

According to the present invention, there is provided a production method of a dielectric ceramic composition comprising a main component and a fourth subcomponent including a compound of Zr, wherein:

a granular compound of Zr having a maximum grain diameter in a range of 0.1 to 6.0 μm is used as a material of the fourth subcomponent; and a content of the compound of Zr with respect to 100 moles of the main component is larger than 0 mole and less than 5 moles in terms of Zr.

In the production method of the present invention, a compound of Zr, wherein the maximum grain diameter is in the above predetermined range, is used as the granular Zr compound as a material of the fourth subcomponent. Therefore, a dispersion state (distribution state) of the Zr compound in the dielectric ceramic composition can be controlled, and the effect of adding the Zr compound can be fully brought out. Namely, the breakdown voltage and the TC bias characteristics can be improved more effectively.

Note that the maximum grain diameter of the Zr compound used in the production method of the present invention means the maximum grain diameter among "particle diameters of actual particles" measured by SEM observation, etc. Also, "particle diameters of actual particles" means, for example in the case where there is an aggregation in particles, particle diameters of respective particles composing the aggregation and does not mean a particle diameter of the aggregation itself.

Alternately, a production method of a dielectric ceramic composition comprises a main component and a fourth subcomponent including a compound of Zr, wherein:

a granular compound of Zr, wherein a difference (D100–D50) of a D50 diameter of 50% equivalent diameter and a D100 diameter of 100% equivalent diameter is 70 μm or smaller, is used as a material of the fourth subcomponent; and a content of the compound of Zr with respect to 100 moles of the main component is larger than 0 mole and less than 5 moles in terms of Zr.

In the above method, as a granular compound of Zr as a material of the fourth subcomponent, a Zr compound, wherein a difference (D100–D50) of the D50 diameter and the D100 diameter is in the above predetermined range, is used. Therefore, a dispersion state (distribution state) of the Zr compound in the dielectric ceramic composition can be controlled, and the effect of adding the Zr compound can be fully brought out. Namely, the breakdown voltage and the TC bias characteristics can be improved more effectively.

Note that, in the present invention, the above D50 diameter and the D100 diameter respectively mean a volume-reduced cumulative 50% diameter and volume-reduced cumulative 100% diameter and are normally measured by the laser diffraction method using light scattering, etc.

Preferably, the production method of the dielectric ceramic composition of the present invention comprises a main component and a fourth subcomponent including a compound of Zr, wherein:

a granular compound of Zr, wherein the maximum grain particle is in a range of 0.1 to 6.0 μm and a difference (D100–D50) of a D50 diameter of 50% equivalent diameter and a D100 diameter of 100% equivalent diameter is 70 μm or smaller, is used as a material of the fourth subcomponent; and a content of the compound of Zr with respect to 100 moles of the main component is larger than 0 mole and less than 5 moles in terms of Zr.

In the production method of the present invention, as the Zr compound, an oxide of Zr and composite oxides of Zr and other element, or a variety of compounds, which becomes an oxide of Zr or the composite oxides by firing, such as carbonate, oxalate, nitrate, hydroxide and organic metal compound, may be mentioned.

Particularly, as the Zr compound, $CaZrO_3$ or ($CaO+ZrO_2$) is preferably used. In the present invention, the ($CaO+ZrO_2$) is a material obtained by mixing an oxide of Ca and an oxide of Zr. When using the ($CaO+ZrO_2$), it is preferable that the entire ($CaO+ZrO_2$) satisfies the above grain diameter range. Note that the mixing ratio of CaO and $ZrO_2$ may be any in ($CaO+ZrO_2$).

In the production method of the present invention, preferably, a compound including Ba, Ca and Ti and having a perovskite crystal structure expressed by a general formula of $ABO_3$ is used as the main component material. More preferably, a compound expressed by a composition formula of $(Ba_{1-x}Ca_x)_m(Zr_{1-y}Ti_y)O_3$, wherein "m", "x" and "y" satisfy $0.995 \leq m \leq 1.020$, $0 < x \leq 0.15$, and $0 \leq y \leq 1.00$ is used.

An electronic device according to the present invention includes dielectric layers composed of the above dielectric ceramic composition or a dielectric ceramic composition obtained by the production method of the present invention explained above. As the electronic device, while not particularly limited, a multilayer ceramic capacitor, piezoelectric device, chip inductor, chip varistor, chip thermistor, chip resistor, and other surface mounted chip electronic devices (SMD) may be mentioned.

A multilayer ceramic capacitor according to the present invention is configured by alternately stacking dielectric layers composed of the above dielectric ceramic composition or a dielectric ceramic composition obtained by the production method of the present invention explained above and internal electrode layers.

According to the present invention, it is possible to provide a dielectric ceramic composition having high specific permittivity, capable of maintaining an insulation resistance lifetime and DC bias characteristics, having capacity-temperature characteristics satisfying the X8R characteristics, and having an improved breakdown voltage and TC bias characteristics. Furthermore, according to the present invention, it is possible to provide an electronic device, such as a multilayer ceramic capacitor, having the above characteristics and capable of realizing a compact body with a larger capacity as a result of using the dielectric ceramic composition as above.

Particularly, according to the present invention, a dispersion state of the Zr compound in the dielectric ceramic composition is controlled, so that the breakdown voltage and TC bias characteristics, which have caused disadvantages in the Japanese Unexamined Patent Publication No. 2004-214539 above, can be improved. Note that the Japanese Unexamined Patent Publication No. 2004-214539 discloses a dielectric ceramic composition including Zr, such as $CaZrO_3$, as the example. However, controlling of the dispersion state of Zr is insufficient in the Japanese Unexamined Patent Publication No. 2004-214539, so that there is a disadvantage that the effect of adding Zr can not be fully brought out.

BRIEF DESCRIPTION OF DRAWINGS

Below, embodiments of the present invention will be explained in detail based on the attached drawings, in which.

DESCRIPTION OF THE PREFERRED EMBODIMENT

Multilayer Ceramic Capacitor 1

Figure 1:
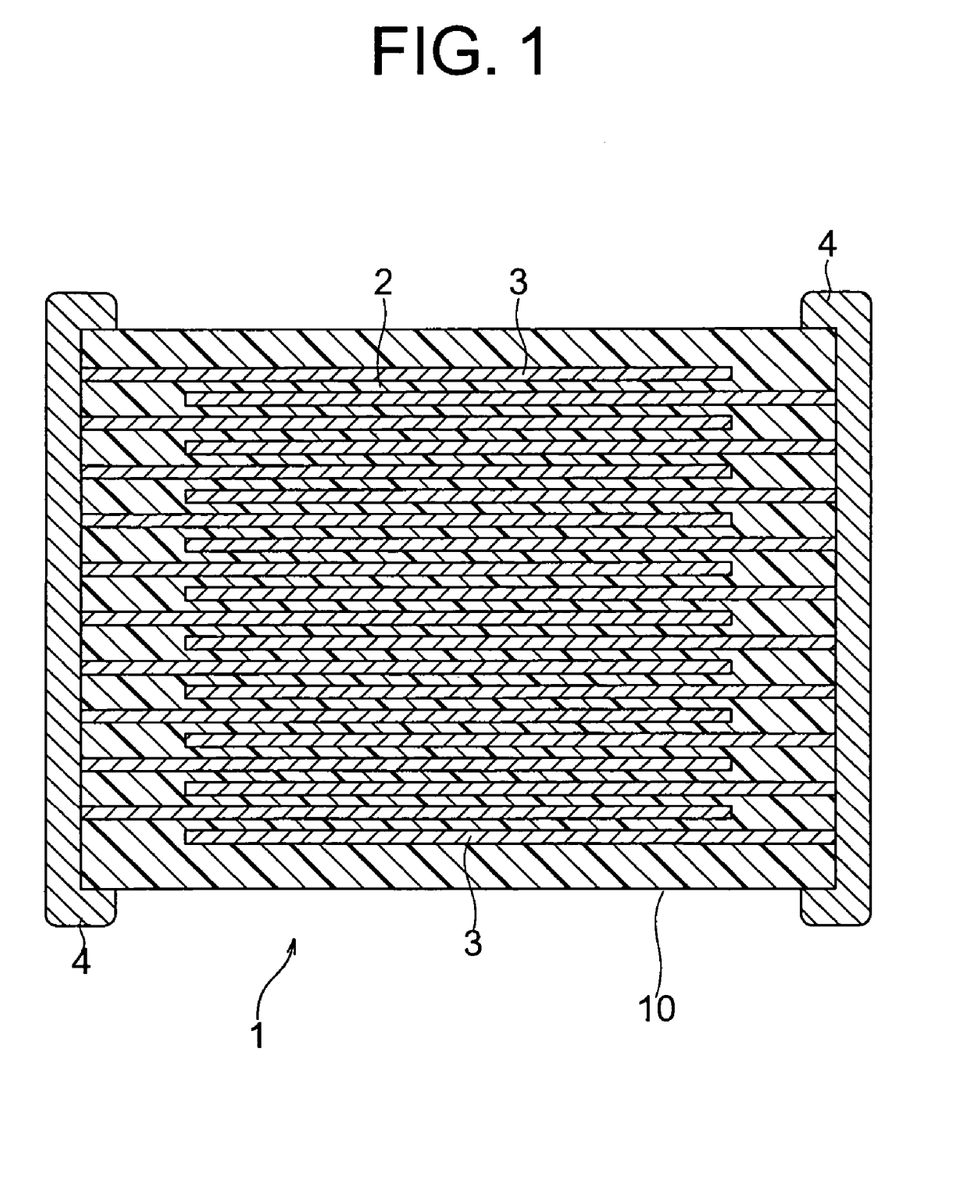
FIG. 1 is a sectional view of a multilayer ceramic capacitor according to an embodiment of the present invention.

As shown in FIG. 1, a multilayer ceramic capacitor 1 according to an embodiment of the present invention comprises a capacitor element body 10, wherein dielectric layers 2 and internal electrode layers 3 are alternately stacked. Both end portions of the capacitor element body 10 are formed with a pair of external electrodes 4 respectively conducting to the internal electrode layers 3 arranged alternately in the element body 10. A shape of the capacitor element body 10 is not particularly limited, but is normally rectangular parallelepiped. Also, the size is not particularly limited and may be a suitable size in accordance with the use object.

The internal electrode layers 3 are stacked, so that the respective end surfaces are exposed alternately to surfaces of two facing end portions of the capacitor element body 10. The pair of external electrodes 4 are formed on both end portions of the capacitor element body 10 and connected to the exposed end surfaces of the alternately arranged internal electrode layers 3, so that a capacitor circuit is configured.

Dielectric Layer 2

The dielectric layer 2 includes a dielectric ceramic composition of the present invention.

In the present embodiment, the above dielectric ceramic composition comprises a main component including Ba, Ca and Ti and having a perovskite crystal structure expressed by a general formula of $ABO_3$, a fourth subcomponent including a compound of Zr, and other subcomponents.

As the compound having a perovskite crystal structure expressed by a general formula of $ABO_3$ as the main component, compounds expressed by a composition formula of $(Ba_{1-x}Ca_x)_m(Zr_{1-y}Ti_y)O_3$ are preferable. At this time, an oxygen (O) amount may be a little deviated from the above stoichiometric composition.

In the above formula, "x" satisfies preferably $0 < x \leq 0.15$, and more preferably $0.02 \leq x \leq 0.10$. The "x" indicates the number of atoms of Ca, and a phase transition point of the crystal can be freely shifted by changing the "x", and a Ca/Ba ratio. Therefore, the capacity-temperature coefficient and the specific permittivity can be freely controlled.

In the above formula, "y" satisfies preferably $0 \leq y \leq 1.00$ and, more preferably $0.05 \leq y \leq 0.80$. The "y" indicates the number of atoms of Ti, and when substituting by $ZrO_2$ being hard to be reduced comparing with $TiO_2$, it is liable that the reduction resistance becomes furthermore higher. Note that, in the present invention, a ratio of Zr and Ti may be any and only one of the two may be included.

In the above formula, "m" preferably satisfies $0.995 \leq m \leq 1.020$, and more preferably $1.000 \leq m \leq 1.006$. As a result that "m" is 0.995 or higher, it is possible to prevent it from becoming semiconductor due to firing in a reducing atmosphere, and as a result that "m" is 1.020 or lower, a fine sintered body can be obtained without heightening the firing temperature.

The Zr compound as the fourth subcomponent has an effect of shifting the Curie's temperature to the high temperature side, an effect of flattening the capacity-temperature characteristics, in addition to that, an effect of improving the breakdown voltage and an effect of improving the TC bias characteristics. Note that, in the present embodiment, the Zr compound is to be included mainly in a later explained segregation-phase.

As the Zr compound, for example, $CaZrO_3$ as a composite oxide with Ca and $ZrO_2$ as an oxide thereof, etc. are preferably used. Note that when using an oxide of Zr, preferably, it is mixed with an oxide of Ca and used as (CaO+ZrO$_2$). As a result that the Zr compound is included as CaZrO$_3$ or (CaO+ZrO$_2$), affinity of the Zr compound with main component materials can be increased, so that a dispersion state of the Zr compound can be improved.

A content of the fourth subcomponent is larger than 0 mole but smaller than 5 moles, and preferably 1.0 mole or larger and 3.0 moles or smaller in terms of Zr with respect to 100 moles of the main component. Note that when including a composite oxide CaZrO$_3$ as the fourth subcomponent, the content is in terms of CaZrO$_3$, and when including (CaO +ZrO$_2$), the content is in terms of ZrO$_2$. When the content of Zr compound is too much, the breakdown voltage and TC bias characteristics tend to decline. But when the Zr compound is not added, the effects of adding Zr cannot be obtained.

Also, when (CaO+ZrO$_2$) is included as the Zr compound, a mole ratio of Ca and Zr may be any, but preferably Ca/Zr=0.5 to 1.5, more preferably Ca/Zr=0.8 to 1.5, and particularly preferably Ca/Zr=0.9 to 1.1.

In the present embodiment, in addition to the fourth subcomponent including the Zr compound, it is preferable to include first to third subcomponents below as other subcomponents and, more preferably, a fifth subcomponent and a sixth subcomponent below are furthermore included.

Namely, it is preferable to include a first subcomponent including at least one kind selected from MgO, CaO, BaO and SrO, a second subcomponent including an oxide of Mn or Cr, a third subcomponent including an oxide of R (note that R is at least one kind selected from Sc, Y, La, Ce, Pr, Nd, Pm, Sm, Eu, Gd, Tb, Dy, Ho, Er, Tm, Yb and Lu), a fifth subcomponent including at least one kind selected from V$_2$O$_5$, MoO$_3$ and WO$_3$, and a sixth subcomponent including oxide silicon as a main component.

Ratios of the respective subcomponents above with respect to 100 moles of the main component are preferably first subcomponent: 0.1 to 5 moles,
second subcomponent: 0.1 to 2.5 moles,
third subcomponent: 0.1 to 12 moles,
fifth subcomponent: 0.01 to 0.2 mole, and
sixth subcomponent: 1 to 10 moles;

and more preferably, first subcomponent: 0.2 to 2.0 moles,
second subcomponent: 0.1 to 0.5 mole,
third subcomponent: 0.2 to 8 moles,
fifth subcomponent: 0.05 to 0.1 mole, and
sixth subcomponent: 2 to 5 moles.

Note that the ratios of the second and third subcomponents above are not mole ratios of an oxide of Mn, oxide of Cr and oxide of R, but mole ratios of Mn elements, Cr elements and R elements alone, respectively. Namely, when using an oxide of Y as the third subcomponent (oxide of R), the ratio of the third subcomponent being 1 mole dose not mean that the ratio of Y$_2$O$_3$ is 1 mole, but the ratio of Y is 1 mole.

Also, in this specification, the respective oxides composing the main component and the subcomponents are expressed by stoichiometric compositions, but an oxidation state of each oxide may be deviated from the stoichiometric composition. Note that the above ratios of the subcomponents are obtained by converting a metal amount contained in an oxide composing each subcomponent to the oxide having the above stoichiometric composition.

As a result of including the first to third, fifth and sixth subcomponents in addition to the fourth subcomponent explained above as the subcomponents, the high permittivity can be maintained while satisfying the X8R characteristics (−55 to 150° C., ΔC=within ±15%). Preferable contents of the first to third, fifth and sixth subcomponents are as above, and the reason is explained below.

The first subcomponent (MgO, CaO, BaO and SrO) exhibits an effect of flattening the capacity-temperature characteristics. When a content of the first subcomponent is too small, the capacity temperature change rate may become large. While, when the content is too much, sinterability may be deteriorated. Note that component ratios of the oxides in the first subcomponent may be any.

The second subcomponent (an oxide of Mn or Cr) exhibits an effect of accelerating sintering, an effect of heightening the IR, and an effect of improving the IR lifetime. When a content of the second-subcomponent is too small, these effects cannot be fully brought out. While, when the content is too large, it is liable that an adverse effect is given to the capacity-temperature characteristics.

The third subcomponent (an oxide of R) exhibits an effect of shifting the Curie's temperature to the high temperature side and an effect of flattening the capacity-temperature characteristics. When a content of the third subcomponent is too small, these effects become insufficient to deteriorate the capacity-temperature characteristics. While, when the content is too large, the sinterability tends to decline. In the present embodiment, because of the high effect of improving the characteristics, Y, Gd, Tb, Dy, Ho, Er and Yb are preferable among the R elements.

The fifth subcomponent (V$_2$O$_5$, MoO$_3$ and WO$_3$) exhibits an effect of flattening the capacity-temperature characteristics at the Curie's temperature or higher and an effect of improving the IR lifetime. When a content of the fifth subcomponent is too small, these effects become insufficient. While when the content is too large, the IR declines remarkably. Note that containing ratio of the oxides in the fifth subcomponent may be any.

As the sixth subcomponent, a compound including oxide silicon as the main component is preferable, and at least one kind selected from SiO$_2$, MO (note that M is at least one kind of element selected form Ba, Ca, Sr and Mg), Li$_2$O and B$_2$O$_3$ is more preferable. The sixth subcomponent acts mainly as a sintering auxiliary and has an effect of improving a defective rate of initial insulation resistance when formed to be a thin layer. When a content of the sixth subcomponent is too small, the capacity-temperature characteristics become poor and the IR (insulation resistance) declines. While, when the content is too large, the IR lifetime becomes insufficient and an abrupt decline of the permittivity is caused.

Note that, in the present embodiment, compounds expressed by (Ba, Ca)$_x$ SiO$_{2+x}$ (note that "x"=0.7 to 1.2) may be also used as the sixth subcomponent. BaO and CaO in [(Ba, Ca)$_x$ SiO$_{2+x}$] are also included in the first subcomponent, but since (Ba, Ca)$_x$ SiO$_{2+x}$ as a composite oxide has a low melting point and, thus, has preferable reactivity with the main component, BaO and/or CaO may be added as the composite oxide. Note that a ratio of Ba and Ca may be any, and only one of them may be included.

In the present embodiment, the dielectric layer 2 includes a segregation phase including a Zr compound. The segregation phase is a part where a Zr compound and other additive subcomponents are segregated and these additive subcomponents exist at higher concentration comparing with those in a main phase composed mainly of a main component.

In the present embodiment, a C.V. value of a distribution of Zr elements calculated by a formula (1) below from standard deviation σ of detection strength and an average detection strength x of the Zr element distribution in the dielectric layer 2 is preferably 100 or lower, more preferably 75 or lower, and furthermore preferably 65 or lower.

$$\text{C.V. value} = (\text{standard deviation } \sigma \text{ of detection strength/an average detection strength } x) \times 100 \quad (1)$$

The above C.V. (coefficient of variation) value is a value obtained by dividing the standard deviation σ of the detection strength of a distribution of Zr elements in the dielectric layer 2 by the average detection strength x of the Zr elements and indicates the dispersion degree of the Zr elements (Zr compound). The lower the value is, the higher the dispersion degree of the Zr elements (Zr compound) is. In the present embodiment, the C.V. value of the Zr element distribution is preferably low, that is, the distribution degree of the Zr elements is preferably high. When the dispersion degree of the Zr elements (Zr compound) is high, the effect of adding the Zr compound can be improved. Note that, in the present embodiment, the Zr elements (Zr compound) included in the dielectric layer 2 is included mainly in the segregation phase. Therefore, the C.V. value of the Zr element distribution indicates a C.V. value of a distribution of the segregation phase.

The C.V. value of the Zr element distribution can be measured, for example, by an EPMA (electron probe micro analysis) of a section of the dielectric layer 2. Namely, element mapping of Zr elements is performed by the EPMA, peak strength of the Zr elements at each part is measured, standard deviation σ of the detection strength and average detection strength x of the Zr element distribution in the dielectric layer 2 are obtained from the peak strength, and the C.V. value can be calculated from the above formula (1). Note that the lower limit of the C.V. value of the Zr element distribution is not particularly limited, but is normally 20 or so.

Also, an average crystal grain diameter of dielectric particles composing the dielectric layer 2 of the present embodiment is preferably 1 μm or smaller, and more preferably 0.5 μm or smaller.

A thickness of the dielectric layer 2 is not particularly limited, but preferably 4.5 μm or thinner, more preferably 3.5 μm or thinner, and furthermore preferably 3.0 μm or thinner per one layer. The lower limit of the thickness is not particularly limited but is, for example, 0.5 μm or so.

The number of stacked layers of the dielectric layers 2 is not particularly limited, but is preferably 20 or larger, more preferably 50 or larger, and particularly preferably 100 or larger. The upper limit of the number of stacked layers is not particularly limited, but is, for example, 2000 or so.

Internal Electrode Layer 3

A conductive material included in the internal electrode layer 3 is not particularly limited, but since components of the dielectric layer 2 has reduction-resistance, relatively inexpensive base metals may be used. As base metals to be used as the conductive material, Ni or a Ni alloy are preferable. As the Ni alloy, an alloy of one or more kinds of elements selected from Mn, Cr, Co and Al with Ni is preferable, and a content of Ni in the alloy is preferably 95 wt % or more. Note that the Ni or Ni alloy may contain various trace components, such as P, in an amount of not more than 0.1 wt % or so. A thickness of the internal electrode layer 3 may be suitably determined in accordance with the use object, etc., but normally it is preferably 0.1 to 3 μm, and particularly 0.2 to 2.0 μm or so.

External Electrode 4

A conductive material included in the external electrode 4 is not particularly limited, but inexpensive Ni, Cu and alloys of these may be used in the present invention. A thickness of the external electrode 4 may be suitably determined in accordance with the use object, etc., but normally 10 to 50 μm or so is preferable.

Production Method of Multilayer Ceramic Capacitor 1

A multilayer ceramic capacitor 1 in the present embodiment is produced by preparing a green chip by a normal printing method or sheet method using a paste, firing the same, then, printing or transferring external electrodes and firing in the same way as in a multilayer ceramic capacitor of the related art. Below, the production method will be explained specifically.

First, dielectric ceramic composition powder included in the dielectric layer paste is prepared and made to be slurry to fabricate a dielectric layer paste.

The dielectric layer paste may be organic slurry obtained by kneading the dielectric ceramic composition powder with an organic vehicle or water based slurry.

As the dielectric ceramic composition powder, the above oxides, mixtures thereof, and composite oxides may be used, and also it may be suitably selected from a variety of compounds to be the above oxides, and composite oxides by firing, such as carbonate, oxalate, nitrate, hydroxide and organic metal compound, etc., and mixed for use. A content of each compound in the dielectric ceramic composition powder may be determined, so that a composition of the above dielectric ceramic composition after firing is obtained. In a state before being made to be slurry, a particle diameter of the dielectric ceramic composition powder is normally 0.1 to 1 μm or so in the average particle diameter.

In the present embodiment, as a material of the Zr compound included in the fourth subcomponent, a granular Zr compound having a maximum grain diameter is in a range of 0.1 to 6.0 μm, and preferably 1.0 to 3.5 μm is used. By using a granular Zr compound having the maximum grain diameter in the predetermined range as above, a dispersion state (distribution state) of the Zr compound in the dielectric layer 2 can be controlled, and a desired grain diameter can be obtained by mixing and milling the main component material and other subcomponent materials. Therefore, the effect of adding the Zr compound can be fully brought out. Namely, the breakdown voltage and the TC bias characteristics can be improved more effectively.

When the maximum grain diameter of the Zr compound to be used as the subcomponent material is too small, aggregation of the grains arise and the dispersion degree declines. Therefore, the same adverse effect as that in the case added with too much Zr compound is caused to deteriorate the breakdown voltage and the TC bias characteristics.

Also, when the maximum grain diameter is too large, a size of the grains themselves becomes large, and the grains become hard to be dispersed uniformly. Therefore, the same adverse effect as that in the case added with too much Zr compound is caused to deteriorate the breakdown voltage and the TC bias characteristics.

Note that, in the present embodiment, the maximum grain diameter of the Zr compound means the maximum grain diameter among "particle diameters of actual particles" measured by SEM observation, etc. in the present embodiment. Also, "particle diameters of actual particles" means, for example in the case where there is an aggregation in particles, particle diameters of respective particles composing the aggregation and does not mean a particle diameter of the aggregation itself.

Alternately, in the present embodiment, as a material of the Zr compound included as a subcomponent in the above dielectric layer 2, a granular Zr compound, wherein a difference (D100−D50) of a D50 diameter of 50% equivalent diameter and a D100 diameter of 100% equivalent diameter is 70 μm or smaller, and preferably 30 μm or smaller, is used. Therefore, it is possible to control the dispersion state (distribution state) of the segregation phase including the Zr compound in the dielectric layer 2, and effects of adding the Zr compound can be fully brought out. Namely, the breakdown voltage and the TC bias characteristics can be effectively improved. When the difference (D100−D50) between the D50 diameter and the D100 diameter is too large, unevenness of a particle distribution becomes large, dispersion of the particles becomes difficult. Therefore, the same adverse effect as that in the case added with too much Zr compound is given so as to deteriorate the breakdown voltage and the TC bias characteristics.

Note that the above D50 diameter and the D100 diameter respectively mean a volume-reduced cumulative 50% diameter and volume-reduced cumulative 100% diameter and are normally measured by the laser diffraction method, etc. The laser diffraction method is a measurement method using diffraction and scattering caused by irradiating a light to particles and, for example when there is an aggregation in the particles, a diameter of the aggregation is detected as the particle diameter. Therefore, even in the case where the actual particle diameters (that is, particle diameters in a not aggregated state) are small, when there are a large number of aggregations in the particles-and the degree of aggregation is high, values of the D50 diameter and D100 diameter become larger comparing with the actual particle diameters. Along therewith, the difference (D100−D50) between the D50 diameter and the D100 diameter also becomes large and, in this case, the breakdown voltage and the high temperature load lifetime tend to deteriorate.

Note that, in the present embodiment, the above D50 and D100 of the Zr compound to be used as a material are not particularly limited but the D50 diameter is preferably 0.5 to 2.5 μm or so and D100 diameter is preferably 2.0 to 30 μm or so.

Also, in the present embodiment, as a material of the Zr compound as above, it is particularly preferable to use a granular Zr compound, wherein the maximum particle diameter by SEM observation etc. is in the above range and the difference (D100−D50) between the D50 diameter and the D100 diameter is in the above range. By using a Zr compound as such, the effect of the present invention can be particularly enhanced.

As the Zr compound to be a material of the fourth subcomponent, an oxide of Zr and composite oxides of Zr and other element, or a variety of compounds, which becomes an oxide of Zr or the composite oxides by firing, such as carbonate, oxalate, nitrate, hydroxide and organic metal compound, may be mentioned. Particularly, in the present embodiment, $CaZrO_3$ or $(CaO+ZrO_2)$ is preferably used as the Zr compound. The $(CaO+ZrO_2)$ is a material obtained by mixing an oxide of Ca and an oxide of Zr. When using the $(CaO+ZrO_2)$, it is preferable that the entire $(CaO+ZrO_2)$ satisfies the above grain diameter range.

Note that, in the present embodiment, when mixing the main component materials and materials of the fourth and other subcomponents, a method of mixing the main component materials and the fourth subcomponent materials in advance and a method of mixing the main component materials and materials of the fourth and other subcomponents at a time, etc. may be applied. Particularly in the present embodiment, materials having a grain diameter of the above range are used as the fourth subcomponent materials, the fourth subcomponent materials (Zr compound) can be well dispersed even when mixing the all materials together at a time.

An organic vehicle is obtained by dissolving a binder in an organic solvent. The binder to be used for the organic vehicle is not particularly limited and may be suitably selected from a variety of normal binders, such as ethyl cellulose and polyvinyl butyral. Also, the organic solvent is not particularly limited and may be suitably selected from a variety of organic solvents, such as terpineol, butyl carbitol, acetone, and toluene, in accordance with a method to be used, such as the printing method and sheet method.

Also, when using water based slurry as dielectric layer paste, a water based vehicle obtained by dissolving a water-soluble binder and dispersant, etc. in water is kneaded with a dielectric material. The water-soluble binder used for the water based vehicle is not particularly limited and, for example, polyvinyl alcohol, cellulose and water-soluble acrylic resin, etc. may be used.

The internal electrode layer paste is fabricated by kneading a conductive material formed by the above variety of conductive metals and alloys or a variety of oxides, organic metal compounds, and resinates, etc., which become the above conductive material after firing, with the above organic vehicle.

The external electrode paste may be fabricated in the same way as the above internal electrode layer paste.

A content of the organic vehicle in the above variety of pastes is not particularly limited and may be a normal content, for example, the binder is 1 to 5 wt % or so and the solvent is 10 to 50 wt % or so. Also, additives selected from a variety of dispersants, plasticizers, dielectrics and insulators, etc. may be included in each paste. A total content thereof is preferably 10 wt % or less.

When using the printing method, the dielectric layer paste and the internal electrode layer paste are stacked and printed on a substrate, such as PET, cut to be a predetermined shape and removed from the substrate to obtain a green chip.

When using the sheet method, the dielectric layer paste is used to form a green sheet, the internal electrode layer paste is printed thereon, then, the results are stacked to obtain a green chip.

Before firing, binder removal processing is performed on the green chip. The binder removal processing may be suitably determined in accordance with a kind of a conductive material in the internal electrode layer paste, and when using Ni, a Ni alloy or other base metal as the conductive material, the oxygen partial pressure in the binder removal atmosphere is preferably $10^{-45}$ to $10^5$ Pa. When the oxygen partial pressure is lower than the above range, the binder removal effect declines. While, when the oxygen partial pressure exceeds the above range, the internal electrode layer tends to be oxidized.

Also, as other binder removal conditions, the temperature raising rate is preferably 5 to 300° C./hour and more preferably 10 to 100° C./hour, the holding temperature is preferably 180 to 400° C. and more preferably 200 to 350° C., and the temperature holding time is preferably 0.5 to 24 hours and more preferably 2 to 20 hours. Also, the firing atmosphere is preferably in the air or a reducing atmosphere, and a preferable atmosphere gas in the reducing atmosphere is, for example, a wet mixed gas of $N_2$ and $H_2$.

An atmosphere at firing the green chip may be suitably determined in accordance with a kind of a conductive material in the internal electrode layer paste, and when using Ni, a Ni alloy and other base metal as the conductive material, the oxygen partial pressure in the firing atmosphere is preferably $10^{-7}$ to $10^{-3}$ Pa. When the oxygen partial pressure is lower than the above range, a conductive material in the internal electrode layer is abnormally sintered to be broken in some cases. While, when the oxygen partial pressure exceeds the above range, the internal electrode layer tends to be oxidized.

Also, the holding temperature at firing is preferably 1100 to 1400° C., and more preferably 1200 to 1300° C. When the holding temperature is lower than the above range, densification becomes insufficient, while when exceeding the above range, breakings of electrodes due to abnormal sintering of the internal electrode layer, deterioration of capacity-temperature characteristics due to dispersion of the internal electrode layer component, and reduction of the dielectric ceramic composition are easily caused.

As other firing conditions, the temperature rising rate is preferably 50 to 500° C./hour and more preferably 200 to 300° C./hour, the temperature holding time is preferably 0.5 to 8 hours and more preferably 1 to 3 hours, and the cooling rate is preferably 50 to 500° C./hour and more preferably 200 to 300° C./hour. Also, the firing atmosphere is preferably a reducing atmosphere and a preferable atmosphere gas is, for example, a wet mixed gas of $N_2$ and $H_2$.

When firing in a reducing atmosphere, it is preferable that annealing is performed on the capacitor element body. Annealing is processing for re-oxidizing the dielectric layer and the IR lifetime is remarkably elongated thereby, so that the reliability is improved.

An oxygen partial pressure in the annealing atmosphere is preferably $10^{-1}$ to 10 Pa. When the oxygen partial pressure is lower than the above range, re-oxidization of the dielectric layer becomes difficult, while when exceeding the above range, the internal electrode layer tends to be oxidized.

The holding temperature at annealing is preferably 1100° C. or lower, and particularly preferably 500 to 1100° C. When the holding temperature is lower than the above range, oxidization of the dielectric layer becomes insufficient, so that the IR becomes low and the IR lifetime becomes short easily. On the other hand, when the holding temperature exceeds the above range, not only the internal electrode layer is oxidized to reduce the capacity, but the internal electrode layer reacts with the dielectric base material, and deterioration of the capacity-temperature characteristics, a decline of the IR and a decline of the high temperature load lifetime are easily caused. Note that the annealing may be composed only of a temperature rising step and a temperature lowering step. Namely, the temperature holding time may be zero. In this case, the holding temperature is a synonym of the highest temperature.

As other annealing conditions, the temperature holding time is preferably 0 to 20 hours and more preferably 2 to 10 hours, and the cooling rate is preferably 50 to 500° C./hour and more preferably 100 to 300° C./hour. Also, a preferable atmosphere gas of annealing is, for example, a wet $N_2$ gas, etc.

In the above binder removal processing, firing and annealing, for example, a wetter, etc. may be used to wet the $N_2$ gas and mixed gas, etc. In this case, the water temperature is preferably 5 to 75° C. or so. The binder removal processing, firing and annealing may be performed continuously or separately.

End surface polishing, for example, by barrel polishing or sand blast, etc. is performed on the capacitor element body obtained as above, and the external electrode paste is printed or transferred and fired to form external electrodes 4. A firing condition of the external electrode paste is preferably, for example, at 600 to 800° C. in a wet mixed gas of $N_2$ and $H_2$ for 10 minutes to 1 hour or so. A cover layer is formed by plating, etc. on the surface of the external electrodes 4 if necessary.

A multilayer ceramic capacitor of the present invention produced as above is mounted on a print substrate, etc. by soldering, etc. and used for a variety of electronic apparatuses, etc.

An embodiment of the present invention was explained above, but the present invention is not limited to the above embodiment and may be variously modified within the scope of the present invention.

For example, in the above embodiment, a multilayer ceramic capacitor was taken as an example of an electronic device according to the present invention, but the electronic device according to the present invention is not limited to a multilayer ceramic capacitor and may be any as far as it includes a dielectric layer composed of the dielectric ceramic composition of the present invention.

EXAMPLES

Below, the present invention will be explained based on further detailed examples, but the present invention is not limited to the examples.

Example 1

First, as starting materials for producing the dielectric material, $(Ba_{0.9}Ca_{0.1})TiO_3$ (that is, $(Ba_{1-x}Ca_x)_m(Zr_{1-y}Ti_y)O_3$, wherein m=1, x=0.1 and y=1) as main component material and the first to sixth subcomponents below were prepared.

MgO (first subcomponent): 1.1 mole,
MnO (second subcomponent): 0.3 mole,
$Y_2O_3$ (third subcomponent): 0.7 mole,
$CaZrO_3$ (fourth subcomponent): 1.0 mole,
$V_2O_5$ (fifth subcomponent): 0.03 mole, and
$SiO_2$ (sixth subcomponent): 3.5 moles.

Adding quantities of the first to sixth subcomponents above are indicated by the number of moles in terms of the respective oxides with respect to 100 moles of $(Ba_{0.9}Ca_{0.1})TiO_3$. Note that an adding quantity of the third subcomponent is indicated by the number of moles in terms of Y atoms. Namely, the adding quantity in terms of $Y_2O_3$ is 0.35 moles. Also, an adding quantity of $CaZrO_3$ as fourth subcomponent is in terms of $CaZrO_3$.

Next, the materials of the main component and subcomponents were wet mixed by a ball mill for 16 hours and dried, so that a dielectric material was obtained. Next, 100 parts by weight of the obtained dried dielectric material, 4.8 parts by weight of an acrylic resin, 100 parts by weight of ethyl acetate, 6 parts by weight of mineral spirit and 4 parts by weight of toluene were mixed by a ball mill to form paste, so that dielectric layer paste was obtained.

Note that, in the present example, as $CaZrO_3$ as the material of the fourth subcomponent, $CaZrO_3$ each having a different maximum grain diameter, D50 diameter and D100 diameter as shown in Table 1 was used to produce samples 1 to 7. The maximum grain diameter was obtained by measuring grain diameters by observing by a scanning electronic microscope (SEM) on freely selected 10 scopes each having a size of 30 μm×30 μm. Specifically, a particle diameter of a particle having a maximum particle diameter in the above scope was used as the maximum diameter.

Also, a D50 diameter and D100 diameter of $CaZrO_3$ were obtained by measuring a volume-reduced cumulative 50% diameter and volume-reduced cumulative 100% diameter by weighing 0.1 g of the material $CaZrO_3$ with respect to 90 g of water, then, adding 10 g of a disodium hexamethylene acid 5 wt % aqueous solution and agitating by a homogenizer for 10 minutes and by using a Microtorac HRA made by Nikkiso Technica Co., Ltd. Note that, in the present example, in $CaZrO_3$ used as a material of each sample, the maximum particle diameter of actual particles obtained by the SEM observation and the D100 diameter measured by the laser diffraction method are not identical, and it is considered that it is because an aggregation exists in the CaZrO$_3$ particles.

Next, 44.6 parts by weight of Ni particles, 52 parts by weight of terpineol, 3 parts by weight of ethyl cellulose, and 0.4 parts by weight of benzotriazole were kneaded by a triple-roll to be slurry, so that an internal electrode layer paste was obtained.

By using the pastes, a multilayer ceramic capacitor 1 shown in FIG. 1 was produced as explained below.

First, by using the obtained dielectric layer paste, a green sheet was formed on a PET film, after printing the internal electrode layer paste thereon, the sheet was removed from the PET film. Next, the green sheets and protective green sheets (not printed with the internal electrode layer paste) were stacked and bonded with pressure to obtain a green chip.

Next, the green chip was cut to a predetermined size and subjected to binder removal processing, firing and annealing under the conditions below, so that a multilayer ceramic sintered body was obtained. The binder removal processing condition was the temperature raising rate of 30° C./hour, the holding temperature of 260° C., the temperature holding time of 8 hours, and the atmosphere of in the air. The firing condition was the temperature raising rate of 200° C./hour, the holding temperature of 1240° C., the temperature holding time of 2 hours, cooling rate of 300° C./hour and the atmosphere of wet mixed gas of N$_2$ and H$_2$ (the oxygen partial pressure was 10$^{-2}$ Pa). The annealing condition was the temperature raising rate of 200° C./hour, the holding temperature of 1000° C., the temperature holding time of 2 hours, cooling rate of 300° C./hour and the atmosphere of wet N$_2$ gas (the oxygen partial pressure was 10$^{-1}$ Pa). Note that a wetter, wherein the water temperature was 5 to 75° C., was used to wet the atmosphere gas at the time of firing and annealing.

Next, after polishing end surfaces of the obtained multi-layer ceramic sintered body by sand blasting, In—Ga was applied as external electrodes, so that samples 1 to 7 of the multilayer ceramic capacitor shown in FIG. 1 were obtained.

A size of the obtained capacitor samples was 3.2 mm×1.6 mm×0.6 mm, the number of dielectric layers sandwiched by internal electrode layers was 4, a thickness (a thickness between layers) of one dielectric layer was 2.7 μm, and a thickness of one internal electrode layer was 1.2 μm.

Next, a breakdown voltage, TC bias characteristics and a C.V. value of the Zr elements after firing were measured on each of the obtained capacitor samples by the methods explained below.

The breakdown voltage (the unit is V/μm) was evaluated on a value obtained by connecting each capacitor sample to an alternating current power source, raising an application voltage at a rate of 10 V/s and reading a voltage, at which the capacitor sample broke, from a voltmeter. The higher the breakdown voltage is, the more preferable. The results are shown in Table 1.

TC bias characteristics were measured on the obtained samples by a digital LCR meter (4274A made by YHP) at 1 kHz, 1 Vrms and a bias voltage (direct current voltage) of 7.0 V/μm by changing temperature from −55° C. to 150° C. and evaluated by calculating a change rate of the capacitance from the measurement value at the time of not applying a bias voltage at 25° C. Note that an LCR meter was used for measuring the capacitance, and the measurement was made under a condition of a frequency of 1 kHz and an input signal level of 1 Vrms. Those exhibited −40% or higher were determined to be good. The results are shown in Table 1.

A C.V. value of the Zr elements after firing was measured by an EMPA on dielectric layers of the obtained capacitor samples. Specifically, first, based on the result of element mapping of Zr elements of EPMA, peak strength of the Zr elements at each part on the analysis screen was measured. Next, standard deviation σ of detection strength and average detection strength x of a distribution of the Zr elements in the dielectric layers were obtained from the peak strength, and the C.V. value of the Zr elements after firing was calculated from the standard deviation σ and average detection strength x by the formula (1) below. The lower the C.V value is, the more preferable; and it is preferably 100 or lower in the present example. The results are shown in Table 1.

$$\text{C.V. value} = (\text{standard deviation } \sigma \text{ of detection strength/average detection strength } x) \times 100 \quad (1)$$

Furthermore, in this example, in addition to the above, capacity-temperature characteristics (Tc), specific permittivity (ε), dielectric loss (tanδ), IR lifetime in a direct-current electric field, and DC bias characteristics were also evaluated on the obtained capacitor samples.

Capacity-temperature characteristics (Tc) were evaluated by measuring capacitance of the obtained samples in a temperature range of −55 to 150° C. Specifically, the capacitance was measured by using a digital LCR meter (4274A made by YHP) under a condition of a frequency of 1 kHz and an input signal level of 1 Vrms. Then, a capacitance change rate (ΔC/C, the unit is %) was calculated under a temperature environment at 150° C., at which the capacity-temperature characteristics became worst in the temperature range. The results were that all of the samples exhibited ΔC/C=within ±15% in a range of −55 to 150° C., that is, the X8R characteristics were satisfied.

The specific permittivity ε (no unit) was calculated from capacitance measured on the capacitor samples under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 1000 or higher.

The dielectric loss (tanδ) was measured on the capacitor samples under a condition of the reference temperature of 25° C. by using a digital LCR meter (4274A made by YHP), a frequency of 1 kHz and an input signal level (measurement voltage) of 1.0 Vrms. As a result, all samples exhibited a preferable result of 3.00% or lower.

The IR lifetime in the direct current electric field was obtained by conducting an acceleration test on the capacitor samples in an electric field of 10 V/μm at 200° C., and time until the insulation resistance becomes 1 MΩ or lower was calculated as the lifetime. As a result, all samples exhibited a preferable result of 10 hours or longer.

The DC bias characteristics were evaluated by measuring a change of capacitance (ΔC/C) when gradually applying a direct current voltage to respective samples at a constant temperature (25° C.). As a result of plotting the measurement results, it was confirmed that the capacitance was hard to decrease even when a high voltage was applied and stable DC bias characteristics were obtained in all samples.

Table 1

TABLE 1

| Sample No. | | Adding Quantity [mole] | CaZrO$_3$ Maximum Grain Diameter [μm] | D50 [μm] | D100 [μm] | D100-D50 [μm] | Firing Temperature [°C.] | Breakdown Voltage [V/μm] | Tc-Bias [%] | CV Value of Zr After Firing [%] |
|---|---|---|---|---|---|---|---|---|---|---|
| 1 | Reference Example | 1.0 | 10.0 | 34.1 | 123.1 | 89.0 | 1240 | 89 | −42.1 | 143 |
| 2 | Example | 1.0 | 6.0 | 4.5 | 56.1 | 51.6 | 1240 | 168 | −37.8 | 93.2 |
| 3 | Example | 1.0 | 3.1 | 2.1 | 26.4 | 24.3 | 1240 | 191 | −35.2 | 73.1 |
| 4 | Example | 1.0 | 2.3 | 1.5 | 15.4 | 13.9 | 1240 | 201 | −33.4 | 67.7 |
| 5 | Example | 1.0 | 1.3 | 0.6 | 2.6 | 2.0 | 1240 | 220 | −32.1 | 62.1 |
| 6 | Example | 1.0 | 0.2 | 0.2 | 1.3 | 1.2 | 1240 | 200 | −35.6 | 67.8 |
| 7 | Reference Example | 1.0 | 0.05 | 0.010 | 133.1 | 133.09 | 1240 | 97 | −42.1 | 106 |

Evaluation 1

Figure 2A:
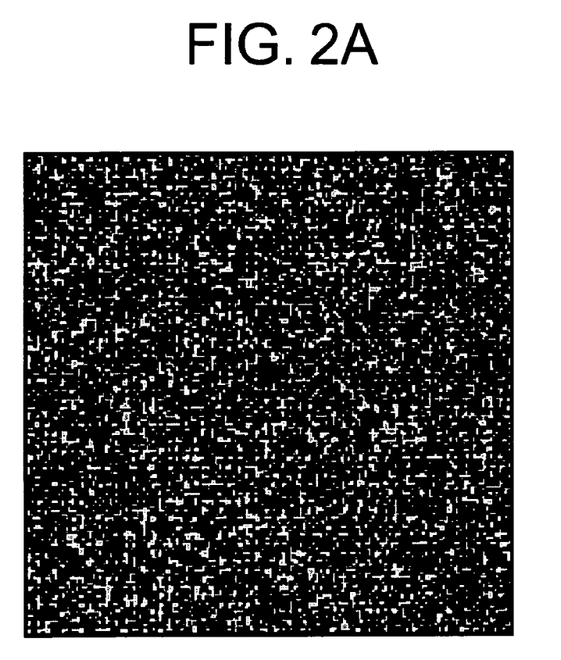
FIG. 2A is a picture showing a segregation state of Zr elements obtained by an EPMA analysis of the fine structure of a dielectric ceramic composition according to an example of the present invention.
Figure 2B:
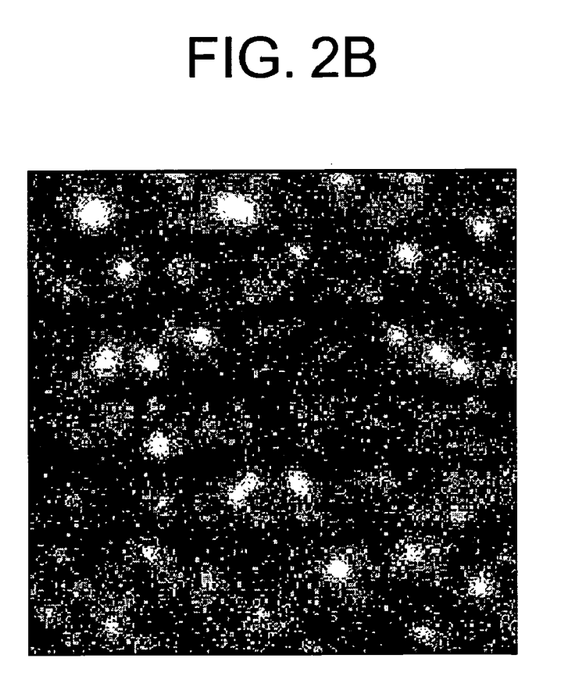
FIG. 2B is a picture showing a segregation state of Zr elements obtained by an EPMA analysis of the fine structure of a dielectric ceramic composition according to a comparative example.

Table 1 shows adding quantities of CaZrO$_3$, particle diameters of used CaZrO$_3$, firing temperatures, breakdown voltages, TC bias characteristics, and C.V. values of Zr elements, and FIG. 2A and FIG. 2B show pictures of segregation states of the Zr elements obtained by performing the EMPA on fine structures of dielectric layers of samples in the example and reference example. Note that FIG. 2A is a picture of dielectric layers of the sample 6 as an example, FIG. 2B is a picture of dielectric layers of the sample 7 as a reference example, and the both are pictures of a scope of 30 μm×30 μm.

From Table 1, all of the samples 2 to 6 as examples using CaZrO$_3$, wherein the maximum particle diameter was 0.1 to 6.0 μm and a difference (D100-D50) between the D50 diameter and the D100 diameter was 70 μm or smaller, as an CaZrO$_3$ material in an adding quantity of 1.0 mole with respect to 100 moles of the main component exhibited a breakdown voltage of 150 V/μm or higher and TC bias characteristics of −40% or higher, which were preferable. Also, in all of the samples 2 to 6 as examples, the C.V. value of the Zr elements after firing was 100 or lower, and the dispersion degree of the Zr elements in the dielectric layers after sintering was confirmed to be high.

On the other hand, both of the samples 1 and 7 as reference examples using CaZrO$_3$, wherein the respective maximum particle diameters were 10.0 μm and 0.05 μm and the respective differences (D100−D50) between the D50 diameter and the D100 diameter were 89.0 μm and 133.09 μm, exhibited a breakdown voltage of lower than 100 V/μm and the TC bias characteristics lower than −40% or higher. The results indicate that they are poor in the breakdown voltage and the TC bias characteristics. Also, in both of the samples 1 and 7 as reference examples, the respective C.V. values of Zr elements after sintering exceeded 100, so that the dispersion degree of the Zr elements in the dielectric layers after sintering was confirmed to be low.

Furthermore, as is obvious from FIG. 2A and FIG. 2B, in the sample 6 as an example, the dispersion degree is high in the segregation phase including the Zr elements, while in the sample 7 as a reference example, it is confirmed that the particle diameter is large, the dispersion degree is low and the distribution is uneven in the segregation phase including the Zr elements.

From the results, to heighten the breakdown voltage and improve the TC bias characteristics, it was confirmed that it is preferable to obtain a C.V. value of Zr after firing of 100 or lower. Furthermore, by using a Zr compound, wherein the maximum grain diameter is in a range of 0.1 to 6.0 μm and a difference of the D50 diameter and D100 diameter (D100−D50) is 70 μm or smaller as a Zr compound material (for example CaZrO$_3$), it was confirmed that a C.V. value of Zr of 100 or lower can be obtained.

Also, from the result of the sample 7 as a reference example, when the actual particle diameter of the Zr element material observed by a SEM is too small, it was confirmed that aggregation increases and the aggregation degree becomes high, so that the C.V. value of Zr exceeds 100. In the reference example 7, the C.V. value became high, and poor results of a declined breakdown voltage and declined TC bias characteristics were exhibited.

Example 2

Other than changing an adding quantity of CaZrO$_3$ as the fourth subcomponent material to 4.0 moles with respect to 100 moles of the main component, samples 11 to 17 of the multilayer ceramic capacitor were produced in the same way as in the example 1, and the respective characteristics were measured in the same way as in the example 1. Note that, in the samples 11 to 17 in the present example, the same CaZrO$_3$ as those in the samples 1 to 7 in the example 1 were used, respectively.

Table 2

TABLE 2

| Sample No. | | Adding Quantity [mole] | CaZrO$_3$ Maximum Grain Diameter [μm] | D50 [μm] | D100 [μm] | D100-D50 [μm] | Firing Temperature [°C.] | Breakdown Voltage [V/μm] | Tc-Bias [%] | CV Value of Zr After Firing [%] |
|---|---|---|---|---|---|---|---|---|---|---|
| 11 | Reference Example | 4.0 | 10.0 | 34.1 | 123.1 | 89.0 | 1240 | 77 | −45.6 | 133 |
| 12 | Example | 4.0 | 6.0 | 4.5 | 56.1 | 51.6 | 1240 | 156 | −39.8 | 89.1 |

TABLE 2-continued

| Sample No. | | Adding Quantity [mole] | CaZrO₃ Maximum Grain Diameter [µm] | D50 [µm] | D100 [µm] | D100-D50 [µm] | Firing Temperature [°C.] | Breakdown Voltage [V/µm] | Tc-Bias [%] | CV Value of Zr After Firing [%] |
|---|---|---|---|---|---|---|---|---|---|---|
| 13 | Example | 4.0 | 3.1 | 2.1 | 26.4 | 24.3 | 1240 | 178 | −37.8 | 70.1 |
| 14 | Example | 4.0 | 2.3 | 1.5 | 15.4 | 13.9 | 1240 | 191 | −35.5 | 65.7 |
| 15 | Example | 4.0 | 1.3 | 0.6 | 2.6 | 2.0 | 1240 | 203 | −34.1 | 60.1 |
| 16 | Example | 4.0 | 0.2 | 0.2 | 1.3 | 1.2 | 1240 | 199 | −36.5 | 65.1 |
| 17 | Reference Example | 4.0 | 0.05 | 0.010 | 133.1 | 133.09 | 1240 | 91 | −40.5 | 102 |

Evaluation 2

Table 2 shows adding quantities of CaZrO₃, particle diameters of used CaZrO₃, firing temperatures, breakdown voltage, TC bias characteristics and C.V. values of the Zr elements.

From Table 2, all of the samples 12 to 16 as examples using CaZrO₃, wherein the maximum particle diameter was 0.1 to 6.0 µm and a difference (D100–D50) between the D50 diameter and the D100 diameter was 70 µm or smaller, as a CaZrO₃ material in an adding quantity of 4.0 moles with respect to 100 moles of the main component, exhibited a breakdown voltage of 150 V/µm or higher and TC bias characteristics of −40% or higher, which were preferable results. Also, in all of the samples 12 to 16 as examples, it was confirmed that the C.V. value of the Zr elements after sintering was 100 or lower, and the dispersion degree of the Zr elements in the dielectric layers after sintering was high.

On the other hand, both of the samples 11 and 17 as reference examples using CaZrO₃, wherein the respective maximum particle diameters were 10.0 µm and 0.05 µm and the respective differences (D100–D50) between the D50 diameter and the D100 diameter were 89.0 µm and 133.09 µm, exhibited a breakdown voltage of lower than 100 V/µm and the TC bias characteristics of lower than −40%. The results indicate that the breakdown voltage and TC bias characteristics were poor. Also, in the samples 11 and 17 as reference examples, both of the C.V. values of the Zr elements after sintering exceeded 100, so that the dispersion degree of the Zr elements in the dielectric layers after sintering was confirmed to be low.

From the results, also in the example 2, wherein an adding quantity of Zr elements (CaZrO₃) was 4.0 moles with respect to 100 moles of the main component, the tendency became as same as that in the example 1, and it was confirmed that the Zr elements adding quantity was preferably larger than 0 and smaller than 5 moles in the present invention.

Also, in the same way as in the example 1, the samples in the example 2 exhibited preferable results in the capacity-temperature characteristics (Tc), specific permittivity (ε), dielectric loss (tanδ), IR lifetime in a direct-current electric field, and DC bias characteristics.

Comparative Example 1

Other than changing an adding quantity of CaZrO₃ as the fourth subcomponent to 5.0 moles with respect to 100 moles of the main component, samples 21 to 27 of the multilayer ceramic capacitor were produced in the same way as in the example 1, and the respective characteristics were measured in the same way as in the example 1. Note that in the samples 21 to 27 in the present example, the same CaZrO₃ as those in the samples 1 to 7 in the example 1 were used, respectively.

Table 3

TABLE 3

| Sample No. | | Adding Quantity [mole] | CaZrO₃ Maximum Grain Diameter [µm] | D50 [µm] | D100 [µm] | D100-D50 [µm] | Firing Temperature [°C.] | Breakdown Voltage [V/µm] | Tc-Bias [%] | CV Value of Zr After Firing [%] |
|---|---|---|---|---|---|---|---|---|---|---|
| 21 | Comparative Example | 5.0 | 10.0 | 34.1 | 123.1 | 89.0 | 1240 | 56.7 | −47.8 | 156 |
| 22 | Comparative Example | 5.0 | 6.0 | 4.5 | 56.1 | 51.6 | 1240 | 77.8 | −43.1 | 132 |
| 23 | Comparative Example | 5.0 | 3.1 | 2.1 | 26.4 | 24.3 | 1240 | 85 | −42.1 | 123 |
| 24 | Comparative Example | 5.0 | 2.3 | 1.5 | 15.4 | 13.9 | 1240 | 90 | −41.6 | 116 |
| 25 | Comparative Example | 5.0 | 1.3 | 0.6 | 2.6 | 2.0 | 1240 | 95 | −40.7 | 106 |
| 26 | Comparative Example | 5.0 | 0.2 | 0.2 | 1.3 | 1.2 | 1240 | 81 | −42.1 | 118 |
| 27 | Comparative Example | 5.0 | 0.05 | 0.010 | 133.1 | 133.09 | 1240 | 60 | −44 | 135 |

Evaluation 3

Table 3 shows adding quantities of CaZrO₃, particle diameters of the used CaZrO₃, firing temperatures, breakdown voltages, TC bias characteristics and C.V. values of the Zr elements.

From Table 3, all of the samples 21 to 27, wherein an adding quantity of CaZrO₃ was 5.0 moles with respect to 100 moles of the main component, exhibited breakdown voltages of lower than 100V/μm and TC bias characteristics of lower than −40%, that is, the breakdown voltage and TC bias characteristics were poor. Also, in all of the samples 21 to 27 as comparative examples, C.V. values of the Zr elements after sintering exceeded 100 and the dispersion degree of the Zr elements in the dielectric layers after sintering was confirmed to be low.

From the above results, when an adding quantity of the Zr compound ($CaZrO_3$) was 5.0 moles or larger with respect to 100 moles of the main component, it was confirmed that a C.V. value of Zr after sintering exceeded 100 and the breakdown voltage and TC bias characteristics were deteriorated.

What is claimed is:

1. A dielectric ceramic composition, comprising
   a main component including Ba, Ca and Ti and having a perovskite crystal structure expressed by a general formula $ABO_3$, and
   a fourth subcomponent including a compound of Zr; and
   a fifth subcomponent including at least one compound selected from the group consisting of $V_2O_5$, $MoO_3$ and $WO_3$;
   wherein a content of said fourth subcomponent with respect to 100 moles of said main component is larger than 0 mole and smaller than 5 moles in terms of Zr;
   wherein a content of said fifth subcomponent with respect to 100 moles of said main component is 0.01 to 0.2 mole, and
   a C.V. value of a distribution of Zr element calculated by formula (1) from standard deviation σ of detection strength and an average detection strength x of the Zr element distribution in said dielectric ceramic composition is 100 or lower;
   wherein formula (1) is:

C.V. value=(standard deviation σ of detection strength/an average detection strength $x$)×100.

2. The dielectric ceramic composition as set forth in claim 1, wherein said dielectric ceramic composition includes a segregation phase, and said segregation phase includes a compound of Zr.

3. The dielectric ceramic composition as set forth in claim 1, wherein said compound of Zr is $CaZrO_3$ or ($CaO+ZrO_2$).

4. The dielectric ceramic composition as set forth in claim 1, wherein said main component is expressed by a composition formula of $(Ba_{1-x} Ca_x)_m(Zr_{1-y} Ti_y)O_3$, and "m", "x" and "y" in the composition formula satisfy $0.995 \leq m \leq 1.020$, $0 < x \leq 0.15$, and $0 \leq y \leq 1.00$.

5. The dielectric ceramic composition as set forth in claim 1, further comprising:
   a first subcomponent including at least one compound selected from MgO, CaO, BaO and SrO,
   a second subcomponent including an oxide of Mn or Cr, and
   a third subcomponent including an oxide of R, wherein R is at least one element selected from the group consisting of Sc, Y, La, Ce, Pr, Nd, Pm, Sm, Eu, Gd, Tb, Dy, Ho, Er, Tm, Yb and Lu;
   wherein ratios of the subcomponents with respect to 100 moles of said main component are first subcomponent: 0.1 to 5 moles,
   second subcomponent: 0.1 to 2.5 moles wherein the number of moles of the second subcomponent is a ratio of Mn or Cr elements alone,
   third subcomponent: 0.1 to 12 moles wherein the number of moles of the third subcomponent is a ratio of R alone.

6. The dielectric ceramic composition as set forth in claim 5, wherein the oxide of R included in said third subcomponent is an oxide of at least one element selected from the group consisting of Y, Gd, Tb, Dy, Ho, Er and Yb.

7. The dielectric ceramic composition as set forth in claim 1, wherein:
   said dielectric ceramic composition further comprises a sixth subcomponent including oxide silicon as a main component thereof; and
   a ratio of the sixth subcomponent with respect to 100 moles of said main component is 1 to 10 moles.

8. The dielectric ceramic composition as set forth in claim 1, wherein an average crystal grain diameter of dielectric particles composing said dielectric ceramic composition is 1 μm or smaller.

9. An electronic device comprising a dielectric layer composed of the dielectric ceramic composition as set forth in claim 1.

10. A multilayer ceramic capacitor comprising a capacitor element body, wherein dielectric layers composed of the dielectric ceramic composition as set forth in claim 1 and internal electrode layers are alternately stacked.

11. A method of preparing a dielectric ceramic composition as set forth in claim 1, comprising mixing a main component and a fourth subcomponent including a compound of Zr, wherein:
    a granular compound of Zr having a maximum grain diameter in a range of 0.1 to 6.0 μm is used as a material of said fourth subcomponent; and
    a content of said compound of Zr with respect to 100 moles of said main component is larger than 0 mole and less than 5 moles in terms of Zr.

12. The method of preparing a dielectric ceramic composition as set forth in claim 11, wherein $CaZrO_3$ or ($CaO+ZrO_2$) is used as said compound of Zr.

13. A method of preparing a dielectric ceramic composition as set forth in claim 1 comprising mixing a main component and a fourth subcomponent including a compound of Zr, wherein:
    a granular compound of Zr, wherein a difference (D100–D50) of a D50 diameter of 50% equivalent diameter and a D100 diameter of 100% equivalent diameter is 70 μm or smaller, is used as a material of said fourth subcomponent; and
    a content of said compound of Zr with respect to 100 moles of said main component is larger than 0 mole and less than 5 moles in terms of Zr.

14. The method of preparing a dielectric ceramic composition as set forth in claim 13, wherein $CaZrO_3$ or ($CaO+ZrO_2$) is used as said compound of Zr.

* * * * *